United States Patent
Pawloski et al.

(10) Patent No.: US 7,207,794 B2
(45) Date of Patent: Apr. 24, 2007

(54) POUCH PRODUCTION APPARATUS AND METHOD

(75) Inventors: James C. Pawloski, Bay City, MI (US); Jeffrey S. Hoffman, Linwood, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 484 days.

(21) Appl. No.: 10/755,795

(22) Filed: Jan. 12, 2004

(65) Prior Publication Data

US 2005/0151298 A1   Jul. 14, 2005

(51) Int. Cl.
*B32B 1/00*   (2006.01)

(52) U.S. Cl. ....................... 425/500; 226/97.3
(58) Field of Classification Search .............. 226/7, 226/97.1, 97.3; 264/242; 425/500, 71
See application file for complete search history.

(56) References Cited

U.S. PATENT DOCUMENTS

| | | | |
|---|---|---|---|
| 3,660,973 A | 5/1972 | Susami et al. | |
| 3,731,570 A | 5/1973 | Nelson | 83/370 |
| 3,756,527 A * | 9/1973 | Collins et al. | 242/525.3 |
| 3,764,085 A | 10/1973 | Hawkins | 242/56.6 |
| 3,852,386 A | 12/1974 | Behr | 264/40 |
| 3,873,393 A | 3/1975 | Bruckk et al. | 156/351 |
| 3,904,468 A | 9/1975 | Noguchi | 156/244.25 |
| 4,014,487 A | 3/1977 | Reba et al. | 226/5 |
| 4,144,618 A | 3/1979 | Campo et al. | 19/161.1 |
| 4,306,924 A | 12/1981 | Kamp | |
| 4,455,761 A | 6/1984 | Terhune et al. | 34/14 |
| 4,505,412 A | 3/1985 | Reba | 225/96 |
| 4,555,282 A | 11/1985 | Yano | 156/66 |
| 4,582,455 A | 4/1986 | Krywiczanin et al. | |
| 4,582,549 A | 4/1986 | Ferrell | 156/66 |
| 4,632,321 A | 12/1986 | Danler | 241/62 |
| 4,735,674 A | 4/1988 | Pace | 156/517 |
| 4,755,248 A | 7/1988 | Geiger et al. | 156/244 |
| 4,832,776 A | 5/1989 | Pace | 156/297 |
| 4,904,344 A | 2/1990 | Peiffer | 162/193 |
| 5,085,815 A | 2/1992 | Yeh et al. | 264/142 |
| 5,155,967 A * | 10/1992 | Branson | 53/55 |
| 5,209,387 A | 5/1993 | Long et al. | 226/97 |
| 5,223,187 A | 6/1993 | Chantry et al. | 264/25 |
| 5,383,989 A | 1/1995 | McMahon | 156/66 |
| 5,505,567 A | 4/1996 | Scott | 406/106 |
| 2003/0170078 A1 | 9/2003 | McMahon et al. | |
| 2004/0098845 A1 | 5/2004 | Fukumori et al. | 24/400 |

FOREIGN PATENT DOCUMENTS

| | | |
|---|---|---|
| EP | 0377979 A1 | 12/1989 |
| WO | WO 01/84968 A2 | 11/2001 |
| WO | WO 03/064146 | 8/2003 |

\* cited by examiner

*Primary Examiner*—Robert B. Davis
*Assistant Examiner*—Marissa W. Chaet
(74) *Attorney, Agent, or Firm*—McCracken & Frank LLP

(57) ABSTRACT

A pouch production apparatus includes a pouch forming apparatus operable to form pouches from an elongate web of material and zipper tape and an extrusion apparatus responsive to operation of the pouch forming apparatus and operable to extrude zipper tape. A pneumatic transport apparatus is operable to transport the zipper tape from the extrusion apparatus to the pouch forming apparatus during operation of the pouch forming apparatus. A method of producing a pouch using such apparatus is also disclosed.

8 Claims, 5 Drawing Sheets

POUCH PRODUCTION APPARATUS AND METHOD

TECHNICAL FIELD

The present invention relates to a production apparatus and method, and more particularly to an apparatus and method for producing pouches.

BACKGROUND ART

Thermoplastic storage bags or pouches or bags are widely used to store and/or keep items fresh. A thermoplastic storage pouch may be of the reclosable type in the sense that such a bag includes a section of zipper tape joined to an upper edge of thermoplastic film forming the walls of the pouch wherein the zipper tape includes first and second mating sections. The mating sections can be separated from one another to permit articles to be inserted into or withdrawn from the pouch and further may be closed or occluded to seal the pouch. The opening and closing of the sections may be accomplished with or without the aid of a slider that may be mounted on the zipper tape.

In the past, thermoplastic bags of the foregoing type have been manufactured by separately extruding zipper tape and plastic film and storing the zipper tape and plastic film on separate rolls. Thereafter, the rolls are loaded into a pouch production machine and are unwound from the rolls during production. Such a manufacturing methodology requires bulky and expensive handling apparatus for manipulating the rolls of material. In addition, expense is further increased due to the need for spools or reels upon which the material may be stored.

Many production techniques have been developed for the production of thermoplastic zipper tape. Specifically, it is well known to extrude zipper tape directly into a water bath and to draw the hardened zipper tape sections from the water bath. See, for example, Chantry et al. U.S. Pat. No. 5,223,187.

Transport devices have been developed for transporting articles between locations. For example, pneumatic tube systems have been developed for transporting a shuttle containing one or more documents or other articles. In addition, pneumatic systems have been used to pick up waste thermoplastic product and deliver same to a receptacle for recycling.

SUMMARY OF THE INVENTION

According to one aspect of the present invention, a pouch production apparatus includes pouch forming apparatus operable to form pouches from an elongate web of material and zipper tape and an extrusion apparatus responsive to operation of the pouch forming apparatus and operable to extrude zipper tape. A pneumatic transport apparatus is operable to transport the zipper tape from the extrusion apparatus to the pouch forming apparatus during operation of the pouch forming apparatus.

According to a further aspect of the present invention, a zipper tape transfer system includes an air tube having a first end adapted to receive the zipper tape and a blower for blowing air through the air tube. A venturi is disposed in the air tube adjacent the first end thereof for accelerating air through the air tube.

In accordance with yet another aspect of the present invention, a method of producing storage pouches includes the steps of supplying an elongate web of pouch body material to pouch forming apparatus, providing a length of zipper tape and using pneumatic transport apparatus to transport the length of zipper tape to the pouch forming apparatus. The pouch forming apparatus is operated to produce storage pouches from the elongate web of pouch body material and the length of zipper tape According to still another aspect of the present invention, a method of transferring zipper tape material includes the steps of guiding a zipper tape through a first end of an air tube, accelerating the zipper tape through the pipe with a blower and a venturi and drawing the zipper tape out a second end of the pipe.

Other aspects and advantages of the present invention will become apparent upon consideration of the following detailed description and the attached drawings, in which like elements are assigned like reference numerals.

DESCRIPTION OF THE PREFERRED EMBODIMENTS

Figure 1:
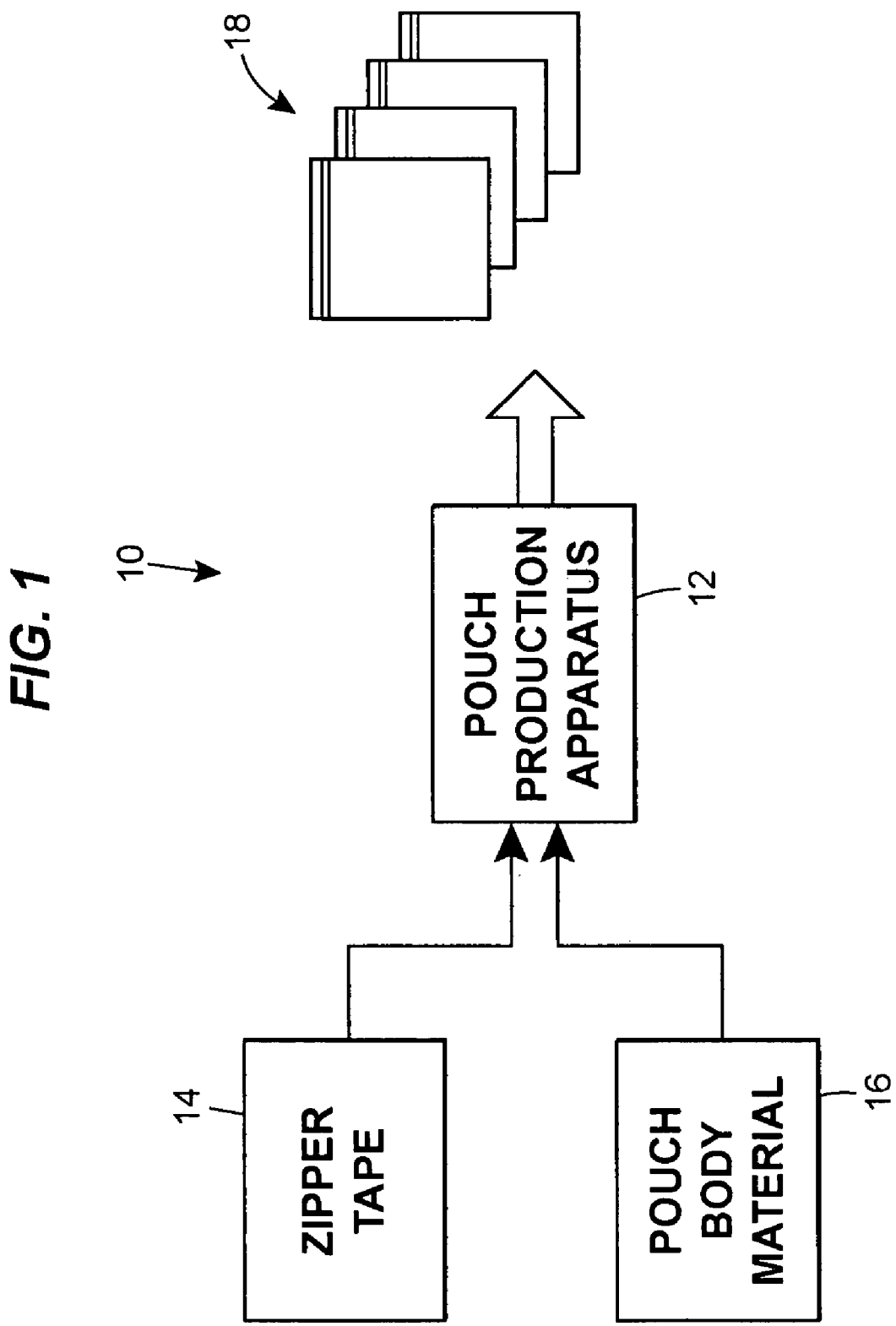
FIG. 1 is a block diagram of a pouch production apparatus incorporating the present invention.

Referring first to FIG. 1, a production system 10 includes a pouch production apparatus 12 that receives zipper tape from a first supply apparatus 14 and pouch body material from a second supply apparatus 16. In the preferred embodiment, the zipper tape and the pouch body material are both made of thermoplastic polymer material and the pouch body material comprises an elongate web of such thermoplastic material that is stored on a spool or reel or produced in-line using film extrusion technology known in the art. The pouch production apparatus 12 is operable to manufacture a plurality of thermoplastic storage pouches or bags 18 from the zipper tape and the pouch body material.

Figure 2:
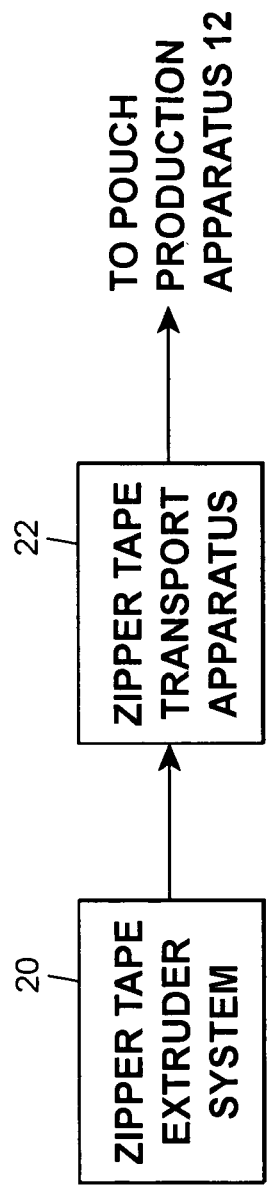
FIG. 2 is a block diagram of a portion of the pouch production apparatus of FIG. 1 according to a first embodiment of the present invention.

Referring next to FIG. 2, according to a first embodiment, the zipper tape supply apparatus 14 may comprise an extruder system 20 that is operable to extrude male and female zipper tape profiles. The zipper tape profiles are supplied to a zipper tape transport apparatus 22 that delivers the profiles to the pouch production apparatus 12.

The embodiment of FIG. 2 is referred to as an in-line production system in that the zipper tape is produced and immediately used to form pouches by the pouch production apparatus 12 without the intermediate step of storing the zipper tape, for example, on a spool or reel. If desired, the extruder system 20 may be responsive to the production rate of the pouch production apparatus 12 whereby the extrusion rate of the zipper tape is precisely matched to the line speed of the pouch production apparatus 12. Alternatively, if desired, the extrusion rate of the extruder system 20 may be somewhat variable and an accumulator may be interposed between the system 20 and the transfer apparatus 22 or between the transfer apparatus 22 and the pouch production apparatus 12 so that any mismatch between the extrusion rate and the line speed of the production apparatus 12 can be accommodated.

Figure 4:
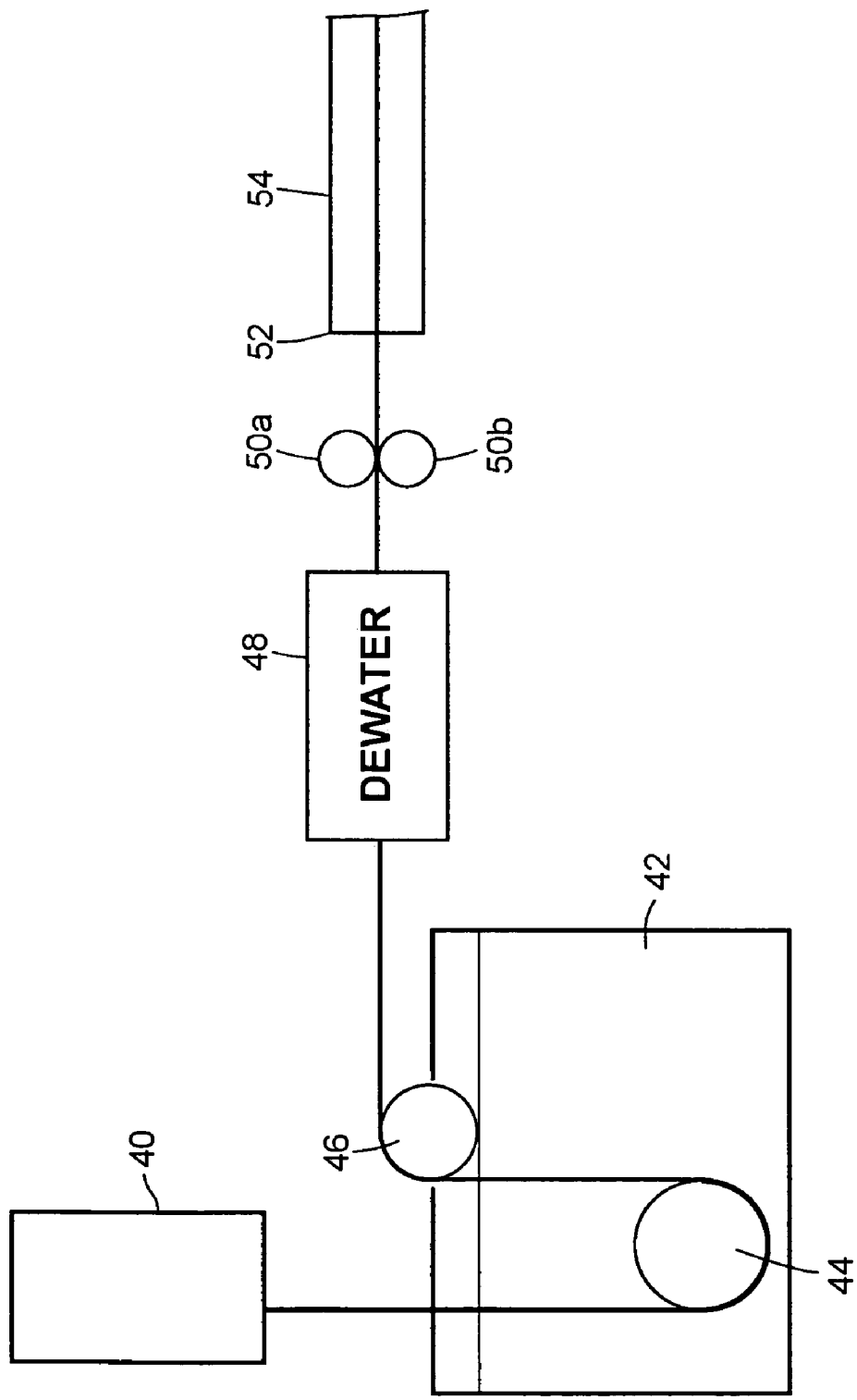
FIG. 4 is a combined block diagram and diagrammatic view of a portion of the apparatus of FIG. 2.

The extruder system 20 may include any conventional extrusion die and associated apparatus as desired. For example, as seen in FIG. 4, a conventional extrusion die 40 simultaneously extrudes the male and female profiles into a conventional water bath-cooling tank 42. Thereafter, the male and female profiles are drawn around one or more rollers 44, 46 and are delivered to a dewatering apparatus 48. The dewatering apparatus 48 removes any water carried by the male and female profiles. The profiles are then preferably delivered separately to a first end 52 of an air tube 54. Alternatively, the profiles maybe be joined together by nip rolls 50A, 50B and delivered to the first end 52 of an air tube 54 as zipper tape.

Figure 3:
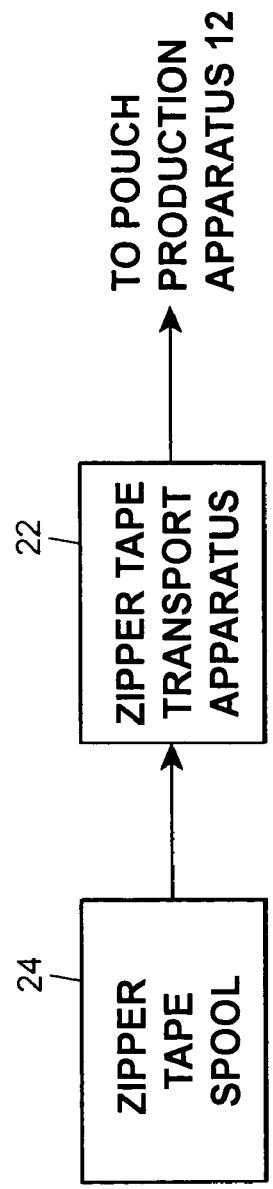
FIG. 3 is a block diagram of a portion of the pouch production apparatus of FIG. 1 according to a second embodiment of the present invention.

According to an alternative embodiment of the present invention as seen in FIG. 3, the male and female zipper tape profiles are stored on a spool or reel 24 and are unwound and provided by the zipper tape transport apparatus 22 to the pouch production apparatus 12.

Figure 5:
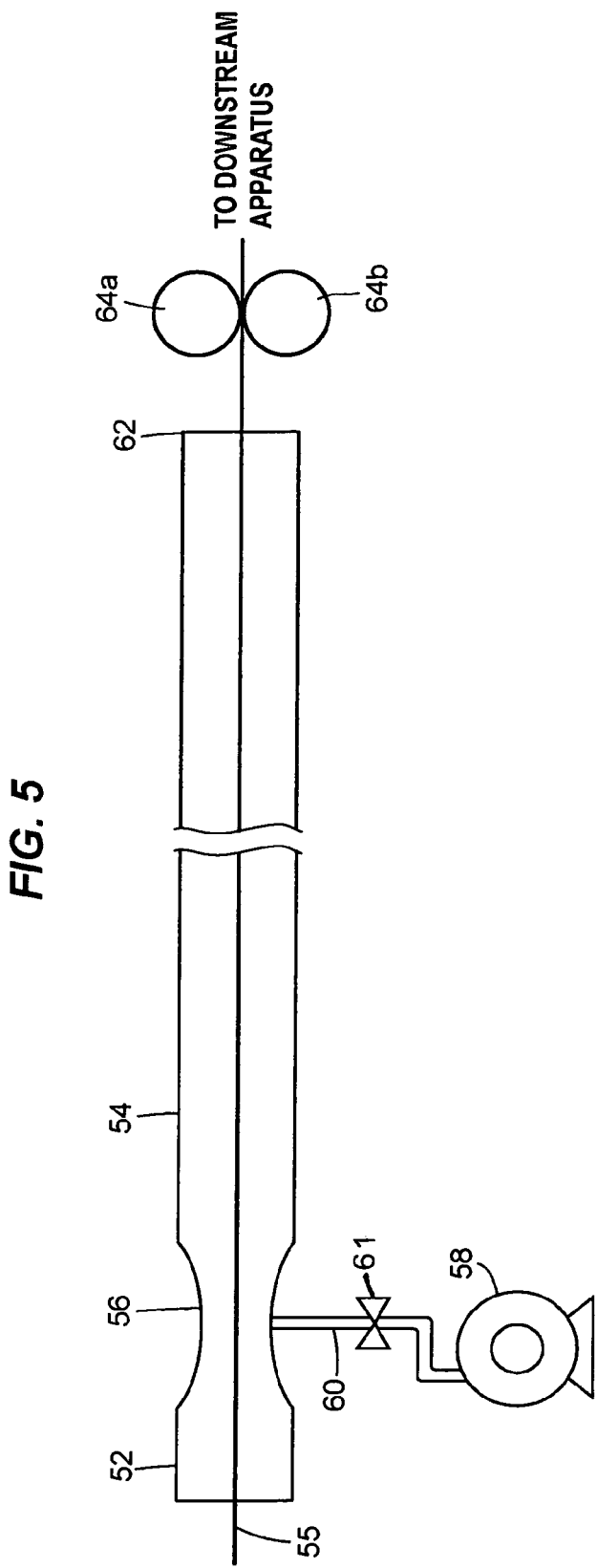
FIG. 5 is a diagrammatic view of the zipper tape transport apparatus of FIGS. 2 and 3.

As seen in FIG. 5, the air tube 54 includes a venturi 56. A source of pressurized air comprising a blower 58 is coupled by a conduit 60 to the venturi 56 with a valve 61 disposed therebetween. The valve 61 is wide open when the production system 10 starts up so that maximum airflow from the blower 58 is utilized to transport the profiles 55 through the air tube 54. As the blower 58 continues to produce airflow in the venturi 56, the high velocity airflow increases the heat within the venturi 56. To avoid overheating of the venturi 56, after the profiles 55 exit the air tube 54 and enter the pouch production apparatus 12 through nip rolls 64a, 64b, the valve 61 is manually turned down to decrease the airflow from the blower 58.

Figure 6:
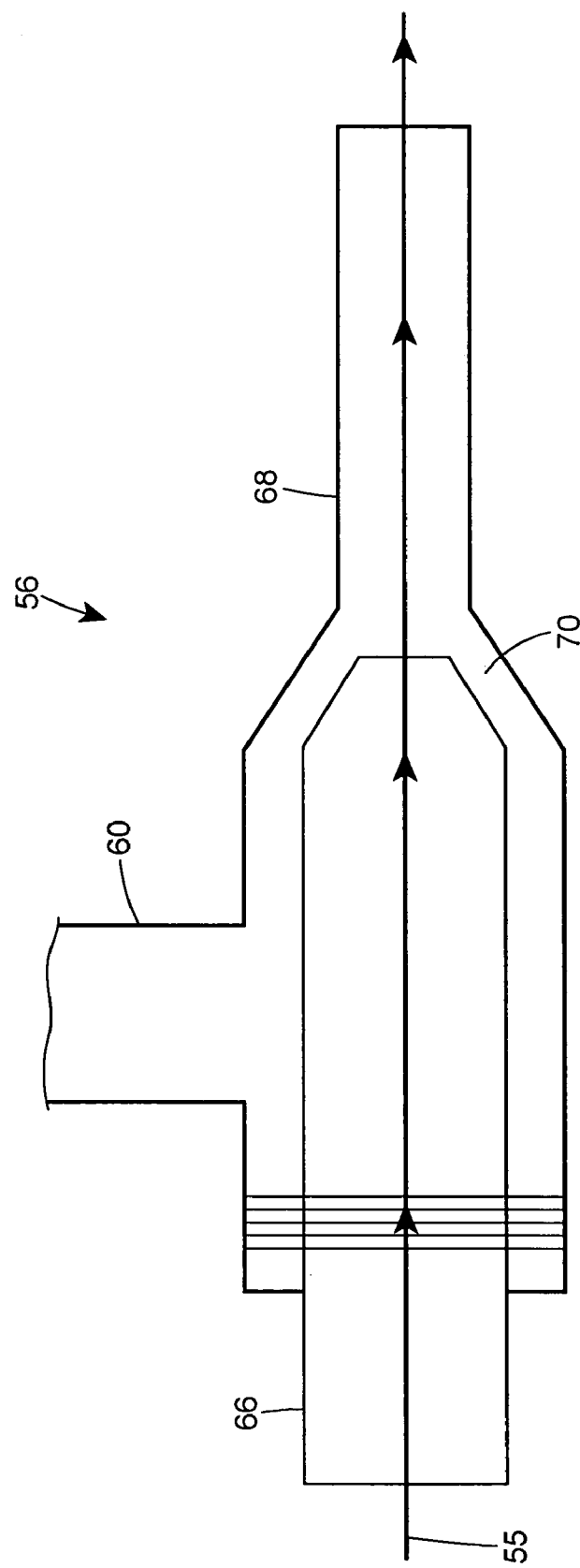
FIG. 6 is a diagrammatic view of the venturi of FIG. 5.

As seen in FIG. 6, the conduit 60 is interconnected with the venturi 56 between an inlet nozzle 66 of the venturi 56 and a body 68 of the venturi 56. The profiles 55 flow through the venturi inlet nozzle 66 and continue through the venturi body 68 until they exit the venturi 56 into the tube 54. By rotating the venturi inlet nozzle 66 clockwise or counter-clockwise, a gap 70 formed between the venturi inlet nozzle 66 and the venturi body 68 increases or decreases until full optimization of the venturi 56 is achieved.

The venturi 56 accelerates the air flow through the air tube 54. When the joined or separated male and female profiles are delivered to the end 52, the profiles are sucked through the air tube 54 and travel outwardly through a second end 62 to a further pair of nip rolls 64a, 64b. The nip rolls 64a, 64b are driven to deliver the mated male and female profiles to downstream processing apparatus, such as the pouch production apparatus 12.

Preferably, the air tube is made of aluminum or stainless steel and is preferably round in cross section. Further, it has been found that mated zipper profiles can be delivered over distances of 75 feet or even greater distances can be traversed through the addition of one or more further venturis and/or blowers and/or by increasing the flow rate of the air delivered by the blower(s).

INDUSTRIAL APPLICABILITY

According to one aspect of the present invention in-line extrusion of zipper tape and transport of such zipper tape to pouch production apparatus are accomplished as the production apparatus is operating to produce pouches. Accordingly, according to this aspect of the present invention, there is no need to store zipper tape on a spool or reel. Further, one or more sources of zipper tape, such as the extruder system 20 or the spool 24, may supply zipper tape through a transport apparatus 22 to more than one pouch production apparatus. In such a case, zipper tape may be extruded and/or unwound from a spool or reel at a single location in a manufacturing facility and may be delivered by transport apparatus as described herein to plural locations in the production facility at which the pouch production machines are disposed.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A pouch production apparatus, comprising:
   pouch forming apparatus operable to form pouches from an elongate web of material and thermoplastic profiles;
   an extrusion apparatus responsive to operation of the pouch forming apparatus and operable to extrude profiles; and
   pneumatic transport apparatus operable to transport the profiles from the extrusion apparatus to the pouch forming apparatus during operation of the pouch forming apparatus.

2. The pouch production apparatus of claim 1, further including an apparatus operable to guide the profiles into and out of the pneumatic transport apparatus.

3. The pouch production apparatus of claim 1, wherein the pneumatic transport apparatus includes an air tube and a source of pressurized air.

4. The pouch production apparatus of claim 3, wherein the profiles are drawn over a roller after exiting the extrusion die and before entering the air tube.

5. The pouch production apparatus of claim 3, wherein the pneumatic transport apparatus further includes a venturi disposed in the air tube.

6. The pouch production apparatus of claim 4, wherein the air tube includes a first end adjacent the extrusion apparatus and a second end adjacent the pouch forming apparatus and wherein the source of pressurized air and the venturi are disposed at the first end.

7. The pouch production apparatus of claim 1, wherein the extrusion apparatus is operable at an extrusion rate dependent upon a speed of production of the pouch forming apparatus.

8. The pouch production apparatus of claim 1, wherein the profiles are combined to form zipper tape.

* * * * *